(12) United States Patent
Al-Shibli

(10) Patent No.: US 10,815,961 B2
(45) Date of Patent: Oct. 27, 2020

(54) OCEAN WAVE POWER GENERATOR WITH ARTIFICIALLY INTELLIGENT CONTROLLER

(71) Applicant: Abu Dhabi Polytechnic, Abu Dhabi (AE)

(72) Inventor: Murad Al-Shibli, Al-Ain (AE)

(73) Assignee: ABU DHABI POLYTECHNIC, Abu Dhabi (AE)

( * ) Notice: Subject to any disclaimer, the term of this patent is extended or adjusted under 35 U.S.C. 154(b) by 0 days.

(21) Appl. No.: 16/857,153

(22) Filed: Apr. 23, 2020

(65) Prior Publication Data

US 2020/0248668 A1    Aug. 6, 2020

Related U.S. Application Data

(63) Continuation-in-part of application No. 16/590,360, filed on Oct. 1, 2019.

(60) Provisional application No. 62/739,368, filed on Oct. 1, 2018.

(51) Int. Cl.
*F03B 13/20* (2006.01)
*F03B 15/00* (2006.01)
*H02K 7/18* (2006.01)

(52) U.S. Cl.
CPC ............. *F03B 13/20* (2013.01); *F03B 15/00* (2013.01); *H02K 7/1876* (2013.01)

(58) Field of Classification Search
CPC ........ F03B 13/20; F03B 15/00; H02K 7/1876
USPC ...................................... 290/1 R, 53; 60/495
See application file for complete search history.

(56) References Cited

U.S. PATENT DOCUMENTS

| 3,696,251 | A | * | 10/1972 | Last | .................... | H02K 35/00 |
| | | | | | | 290/53 |
| 4,851,704 | A | * | 7/1989 | Rubi | ..................... | F03B 13/20 |
| | | | | | | 290/53 |
| 5,211,051 | A | * | 5/1993 | Kaiser | ................ | G01P 15/0894 |
| | | | | | | 73/1.38 |

(Continued)

FOREIGN PATENT DOCUMENTS

WO    2013030164 A2    3/2013

OTHER PUBLICATIONS

Al Shami et al., "A parameter study and optimization of two body wave energy converters." Renewable energy 131, Feb. 2019, 1-13.

(Continued)

*Primary Examiner* — Pedro J Cuevas
(74) *Attorney, Agent, or Firm* — Nath, Goldberg & Meyer; Richard C. Litman

(57) ABSTRACT

The ocean wave power generator with an artificially intelligent controller is a wave power generator based on a two-body mass-spring-damper system, including a first mass, a second mass, and a linear generator coupled to the second mass. A linear actuator is coupled to the second mass, and first and second motion sensors are positioned for detecting position and speed of the first and second masses. The maximum power output of the linear generator is determined based on the position and the speed of the first mass, and an ideal position and an ideal speed of the second mass, corresponding to the maximum power output of the linear generator and the position and the speed of the first mass, are determined. The position and the speed of the second mass are adjusted using a linear actuator to match the ideal position and the ideal speed of the second mass.

4 Claims, 8 Drawing Sheets

(56) References Cited

U.S. PATENT DOCUMENTS

| | | | | |
|---|---|---|---|---|
| 5,347,186 A * | 9/1994 | Konotchick | ......... | H02K 7/1876 310/17 |
| 6,617,705 B1 * | 9/2003 | Smalser | ............ | F03B 13/1855 290/42 |
| 6,644,027 B1 * | 11/2003 | Kelly | ................. | F03B 13/1845 60/498 |
| 6,772,592 B2 * | 8/2004 | Gerber | ............... | F03B 13/1845 290/53 |
| 7,305,823 B2 * | 12/2007 | Stewart | ............... | F03B 13/1845 60/495 |
| 7,345,372 B2 * | 3/2008 | Roberts | .................... | F03G 7/08 290/1 A |
| 7,443,046 B2 * | 10/2008 | Stewart | ................... | F03B 13/20 290/42 |
| 7,453,163 B2 * | 11/2008 | Roberts | .................... | F03G 7/08 290/1 A |
| 7,538,445 B2 * | 5/2009 | Kornbluh | ............ | F03B 13/1845 290/42 |
| 7,649,276 B2 * | 1/2010 | Kornbluh | ............ | F03B 13/1845 290/42 |
| 7,703,562 B2 * | 4/2010 | Kalik | ................... | H02K 7/1892 180/65.31 |
| 7,781,935 B2 * | 8/2010 | Jager | ........................ | H02N 1/08 310/309 |
| 7,999,402 B2 * | 8/2011 | Freeland | ................ | H02K 35/04 290/1 R |
| 8,013,462 B2 * | 9/2011 | Protter | ................... | F03B 13/16 290/42 |
| 8,067,849 B2 * | 11/2011 | Stewart | ................... | F03B 13/16 290/53 |
| 8,069,938 B2 * | 12/2011 | Kalik | ................... | H02K 7/1892 180/65.31 |
| 8,350,394 B2 * | 1/2013 | Cottone | ................ | H01L 41/125 290/1 E |
| 8,587,139 B2 | 11/2013 | Gerber | | |
| 8,723,351 B2 * | 5/2014 | Stewart | ................... | F03B 11/00 290/53 |
| 8,723,353 B1 * | 5/2014 | Franklin | ................. | F03B 13/20 290/42 |
| 8,723,355 B2 * | 5/2014 | Eder | ........................ | F03B 13/16 307/9.1 |
| 8,874,291 B2 * | 10/2014 | Gresser | .............. | B60G 17/0157 701/22 |
| 8,912,678 B2 * | 12/2014 | Nozawa | ................ | F03B 13/186 290/53 |
| 9,115,686 B2 * | 8/2015 | Stewart | ................... | F03B 13/20 |
| 9,140,231 B1 | 9/2015 | Wilson | | |
| 9,683,543 B2 * | 6/2017 | Nozawa | ................ | F03B 13/186 |
| 9,790,913 B2 * | 10/2017 | Stewart | ................... | F03B 13/20 |
| 10,003,240 B2 * | 6/2018 | Rastegar | ................ | H02K 7/1853 |
| 10,011,910 B2 * | 7/2018 | Phillips | .................. | C25B 15/08 |
| 10,082,128 B2 * | 9/2018 | Frtunik | ................... | H02K 35/02 |
| 10,197,040 B2 * | 2/2019 | Abdelkhalik | ............ | F03B 15/00 |
| 10,344,736 B2 * | 7/2019 | Abdelkhalik | ........ | H01J 49/4275 |
| 10,415,537 B2 | 9/2019 | Abdelkhalik et al. | | |
| 10,423,126 B2 | 9/2019 | Wilson | | |
| 2005/0134149 A1 * | 6/2005 | Deng | ...................... | H02N 2/181 310/339 |
| 2007/0126239 A1 * | 6/2007 | Stewart | ................... | F03B 13/20 290/53 |
| 2007/0188153 A1 * | 8/2007 | Jager | ........................ | H02N 1/08 322/2 A |
| 2007/0210580 A1 * | 9/2007 | Roberts | ................... | H02P 9/006 290/1 R |
| 2007/0257491 A1 * | 11/2007 | Kornbluh | ............ | F03B 13/1845 290/53 |
| 2007/0261404 A1 * | 11/2007 | Stewart | ................ | H02K 7/1876 60/495 |
| 2007/0273156 A1 * | 11/2007 | Miyajima | ............... | F03B 13/20 290/53 |
| 2008/0016860 A1 * | 1/2008 | Kornbluh | ................ | F03B 13/20 60/398 |
| 2009/0085357 A1 * | 4/2009 | Stewart | .................... | F03B 13/16 290/53 |
| 2009/0146429 A1 * | 6/2009 | Protter | .................... | F03B 13/20 290/53 |
| 2009/0218824 A1 * | 9/2009 | Freeland | ................ | H02K 35/04 290/1 R |
| 2010/0064678 A1 * | 3/2010 | Cucurella Ripoll | ........................ | F03B 13/1845 60/501 |
| 2010/0148504 A1 * | 6/2010 | Gerber | .................... | F03B 13/16 290/42 |
| 2011/0012368 A1 * | 1/2011 | Hahmann | .............. | F03B 13/187 290/1 C |
| 2011/0109102 A1 * | 5/2011 | McCoy | ..................... | F03G 7/08 290/1 R |
| 2012/0248775 A1 * | 10/2012 | Stewart | ................... | F03B 11/00 290/53 |
| 2012/0248865 A1 * | 10/2012 | Eder | ....................... | F03B 13/16 307/9.1 |
| 2012/0303193 A1 * | 11/2012 | Gresser | ................... | B60L 50/30 701/22 |
| 2015/0152835 A1 * | 6/2015 | Frtunik | ................... | F03B 15/00 290/53 |
| 2017/0298899 A1 * | 10/2017 | Abdelkhalik | ........ | G05B 19/406 |
| 2017/0321650 A9 * | 11/2017 | Frtunik | ................... | F03B 15/00 |
| 2018/0163690 A1 * | 6/2018 | Abdelkhalik | ........... | G06F 1/022 |
| 2018/0163691 A1 * | 6/2018 | Abdelkhalik | ............. | G06F 1/02 |
| 2018/0164754 A1 * | 6/2018 | Wilson | .................... | F03B 15/00 |
| 2018/0164755 A1 * | 6/2018 | Abdelkhalik | ........... | F03B 15/00 |
| 2018/0313321 A1 * | 11/2018 | Nguyen | ............... | G01C 13/004 |

OTHER PUBLICATIONS

Abdelkhalik et al. "Control of small two-body heaving wave energy converters for ocean measurement applications." Renewable energy, 132, Mar. 2019, 587-595.

Fernandes, "Identification and control of a Wave Energy Converter with Neural Networks and Fuzzy Logic models." Institute Superior Técnico, Thesis. 2011.

Nambiar, "Coordinated control and network integration of wave power farms." University of Edinburgh. PhD. Thesis. 2012.

Liang et al., "On the Dynamics and Design of a Two-body Wave Energy Converter." Journal of Physics: Conference Series 744 2016.

Pereira et al., "Control of a wave energy converter using a multi-agent system and machine learning methods" Advances in Renewable Energies Offshore — Guedes Soares (Ed.), Publisher; Taylor & Francis Group, London, pp. 387-392, Oct. 2018.

Al Sham et al., "A parameter study and optimization of two body wave energy converters." Renewable energy 131, Feb. 2019, 1-13.

Abdelkhalik et al., "Control of small two-body heaving wave energy converters for ocean measurement applications." Renewable energy, 132, Mar. 2019, 587-595.

\* cited by examiner

OCEAN WAVE POWER GENERATOR WITH ARTIFICIALLY INTELLIGENT CONTROLLER

CROSS-REFERENCE TO RELATED APPLICATION

This application is a continuation-in-part of U.S. patent application Ser. No. 14/590,360, filed on Oct. 1, 2019, which claims the benefit of U.S. Provisional Patent Application No. 62/739,368, filed on Oct. 1, 2018, each of which is hereby incorporated by reference in its entirety.

BACKGROUND

1. Field

The disclosure of the present patent application relates to wave-based power production, and particularly to an ocean wave power generator with artificially intelligent controller that is based on a two-body mass-spring-damper system, the artificially intelligent controller optimizing power output.

2. Description of the Related Art

FIG. 2 illustrates a conventional wave power generator 100 based on a two-body mass-spring-damper system. The wave power generator 100 includes a first mass 112, having a mass $m_1$, and a second mass 114, having a mass $m_2$. A first spring 116, having a spring constant $k_1$, resiliently couples the first mass 112 to the second mass 114. A first damper 118, having a damping constant $b_1$, joins the first mass 112 and the second mass 114 for damping relative oscillation between the two masses. A second spring 120, having a spring constant $k_2$, resiliently couples the second mass 114 to a support surface S, such as the ground or a floor. A second damper 122, having a damping constant $b_2$, joins the second mass 114 and the support surface S for damping relative oscillation between the second mass 114 and the support surface S. A linear generator 124 is mounted on the support surface S and is coupled to the second mass 114, such that the relative oscillation between the second mass 114 and the support surface S drives the linear generator 124 to generate power. For an oscillatory force generated by a wave, $F_w$, the dynamics of conventional wave power generator 100 are given by:

$$m_1 \ddot{y}_1 + b_1(\dot{y}_1 - \dot{y}_2) + (y_1 - y_2) = F_w \tag{1}$$

and $$m_2 \ddot{y}_2 + (b_1 + b_2)\dot{y}_2 + (k_1 + k_2)y_2 - b_1\dot{y}_1 - k_1 y_1 = 0, \tag{2}$$

where $y_1$ represents the vertical displacement of the first mass 112, $y_2$ represents the vertical displacement of the second mass and the derivatives of equations (1) and (2) are rates of change with respect to time.

The modelling of equations (1) and (2) represents a coupled second order dynamical system with an external wave input force acting on the upper mass 112. Since the linear generator 124 is attached to the lower mass 114, the motion of the lower mass 114 is of interest with regard to the desired output. The overall dynamical model of the lower platform can be formulated in the Laplace domain by equation (3) below:

$$(Y\_2(s))/(F\_w(s)) = (b_1 s + k_1)/(m_1 m_2 s^4 + (m_1(b_1+b_2) + m_2 b_2)s^3 + (m_1(k_1+k_2) + m_2 k_1 + b_1 b_2)s^2 + ((b_1+k_1)(k_1+k_2) - 2 k_1 b_1)s + k_2^2) \tag{3}$$

where $Y_2(s)$ represents the transformed vertical displacement of the second mass 114, and s is the transformation parameter.

Even considering only the motion of the second mass 114, the dynamical model is highly nonlinear and unstable. Thus, although the two-body mass-spring-damper system is effective at producing oscillations, which can be turned into usable power by linear generator 124, it is difficult to model the mechanical parameters that will result in optimal (i.e., maximum) power production. Thus, an ocean wave power generator with an artificially intelligent controller solving the aforementioned problems are desired.

SUMMARY

The ocean wave power generator with an artificially intelligent controller is a wave power generator based on a two-body mass-spring-damper system, including a first mass, a second mass, a first spring resiliently coupling the first mass to the second mass, and a first damper joining the first mass and the second mass for damping relative oscillation between the two masses. Further, the ocean wave power generator with an artificially intelligent controller includes a second spring resiliently coupling the second mass to a support surface, such as the ground or a floor, a second damper joining the second mass and the support surface for damping relative oscillation between the second mass and the support surface, and a linear generator mounted on the support surface and coupled to the second mass, such that relative oscillation between the second mass and the support surface drives the linear generator to generate power.

The ocean wave power generator with an artificially intelligent controller also includes a linear actuator coupled to the second mass, a first motion sensor for detecting the position and speed of the first mass, and a second motion sensor for detecting the position and speed of the second mass. In use, the maximum power output of the linear generator is determined based on the position and the speed of the first mass, and an ideal position and an ideal speed of the second mass, corresponding to the maximum power output of the linear generator and the position and the speed of the first mass, is determined. The position and speed of the second mass are adjusted with the linear actuator to match the ideal position and ideal speed of the second mass. The maximum power output of the linear generator and the ideal position and ideal speed of the second mass are determined from a lookup table, which is generated using an artificial intelligence model of the ocean wave power generator, which may be modeled using a nonlinear autoregressive exogenous neural network (NARX-NN), for example.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
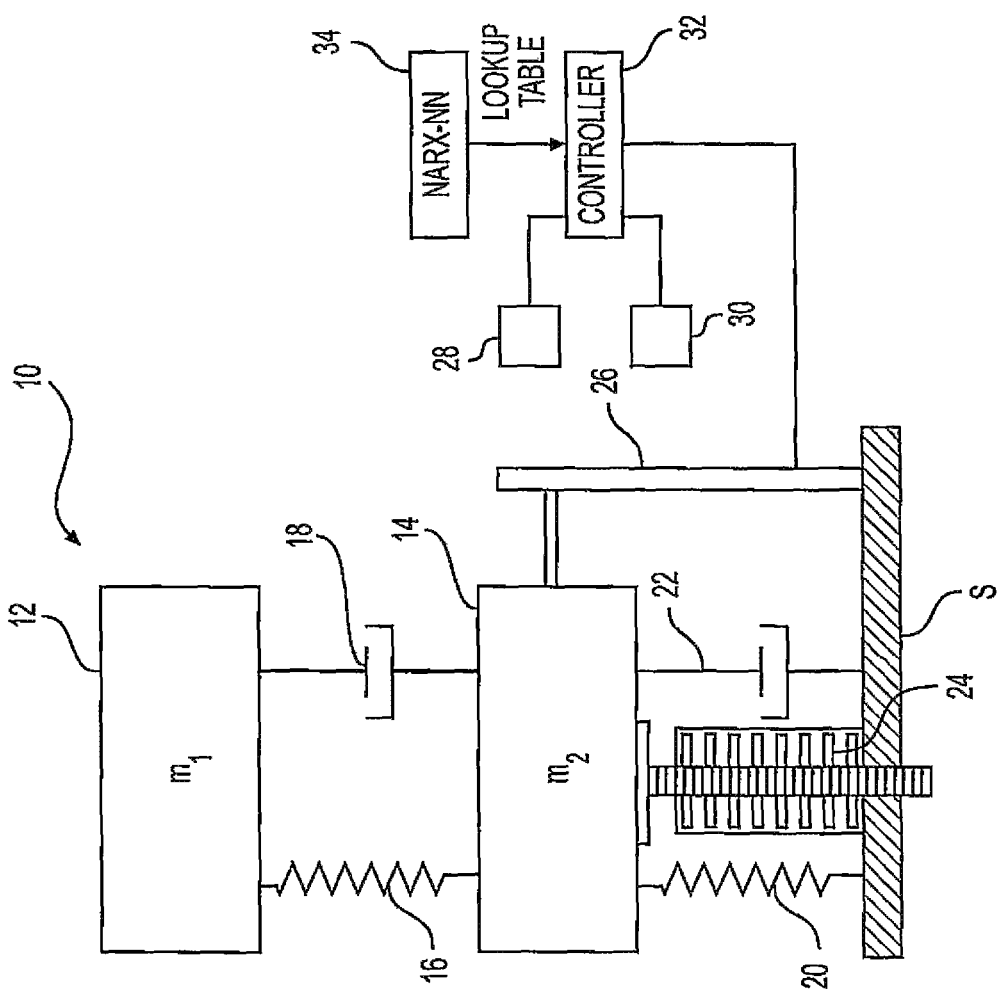
FIG. 1 is a block diagram of an ocean wave power generator with an artificially intelligent controller.
Figure 2:
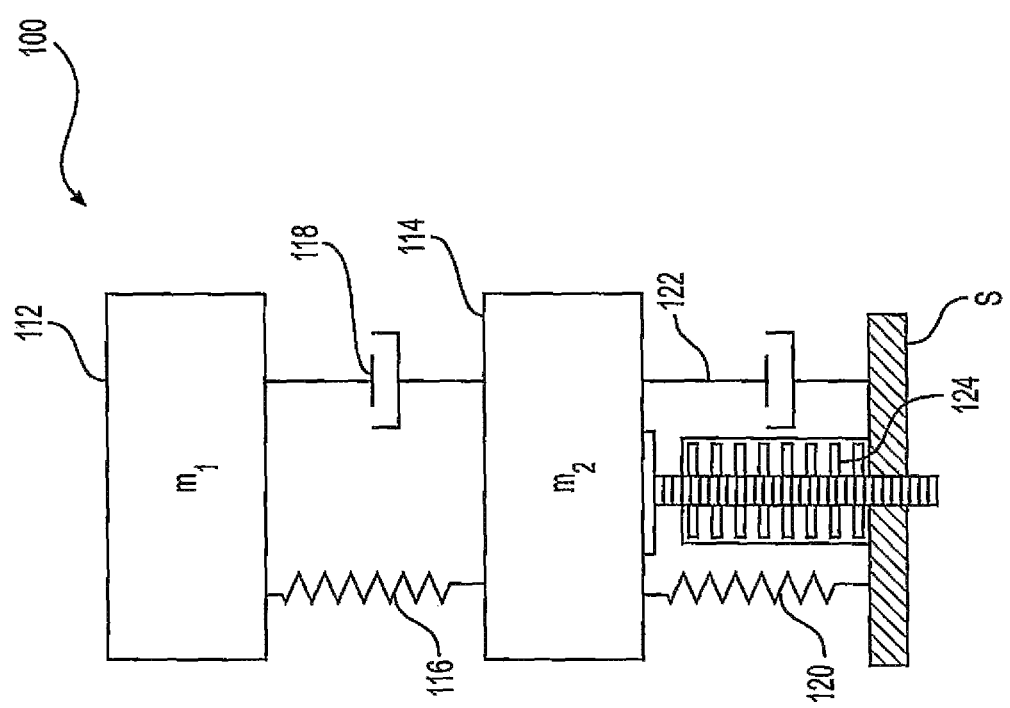
FIG. 2 is a diagram of a conventional prior art wave power generator based on a two-body mass-spring-damper system.

As shown in FIG. 1, the ocean wave power generator with an artificially intelligent controller, designated generally as 10 in the drawings, is similar to the conventional wave power generator 100 of FIG. 2, including a first mass 12 having a mass $m_1$, a second mass 14 having, a mass $m_2$, a first spring 16 having a spring constant $k_1$ resiliently coupling the first mass 12 to the second mass 14, and a first damper 18 having a damping constant $b_1$ joining the first mass 12 and the second mass 14 for damping relative oscillation between the two masses. Further, similar to the conventional wave power generator 100 of FIG. 2, the ocean wave power generator 10 of FIG. 1 also includes a second spring 20 having a spring constant $k_2$ resiliently coupling the second mass 14 to a support surface 5, such as the ground or a floor, a second damper 22 having a damping constant $b_2$ joining the second mass 14 and the support surface S for damping relative oscillation between the second mass 14 and the support surface S, and a linear generator 24 mounted on the support surface S and coupled to the second mass 14, such that relative oscillation between the second mass 14 and the support surface S drives the linear generator 24 to generate power. However, the ocean wave power generator 10 of FIG. 1 also includes a linear actuator 26 coupled to the second mass 14, a first motion sensor 28 for detecting the position and speed of the first mass 12, and a second motion sensor 30 for detecting the position and speed of the second mass 14.

A controller 32, which may be a personal computer, programmable logic controller, microprocessor or the like, receives the position and the speed of the first mass 12 from the first motion sensor 28 and the position and the speed of the second mass 14 from the second motion sensor 30. The controller 32 is configured to output a driving signal to linear actuator 26 to drive oscillatory motion of the second mass 14 to optimize the power output of the linear generator 24 based on the position and the speed of the first mass 12 and the position and the speed of the second mass 14.

It should be understood that the linear generator 24 may be any suitable type of generator for converting oscillatory motion into usable electrical power. For example, the linear generator 24 may comprise or consist of a conductive coil mounted on the support, surface S with a magnetic rod secured to the second mass 14 traveling through the coil in an oscillatory manner as the second mass 14 oscillates. In such a case, calculating the power output of the linear generator 24 is relatively simple, since Faraday's law gives the electrical potential produced across the coil, Vas $V=-NBv\Delta L$, where N is the number of coil loops, B is the magnetic field strength, v is the instantaneous velocity of the magnetic rod (which would be equal, in this case, to the instantaneous velocity of the second mass 14, as measured by the motion sensor 30), and $\Delta L$ is the distance traveled by the magnetic rod within the coil (which would be equal, in this case, to the vertical displacement of the second mass 14, also measured by the motion sensor 30).

Thus, using equations (1) and (2) above, as well as Faraday's law, it is possible to model the power output of the linear generator 24. Since equations (1) and (2) are unstable and highly nonlinear, an artificial intelligence, such as a neural network, may be used to produce a lookup table for all possible values of position and speed (or, equivalently, amplitude and frequency) of the first mass 12 and the second mass 14. For example, a nonlinear autoregressive exogenous neural network (NARX-NN) 34 may be used. Thus, using equations (1) and (2) above, as well as Faraday's law, the NARX-NN 34 produces a lookup table of modeled power outputs of the linear generator 24 for each possible value of position and speed of the first mass 12 and the second mass 14. In use, the first motion sensor 28 measures the real-time position and speed of the first mass 28, and the second motion sensor 30 measures the real-time position and speed of the second mass 30. These values are fed to the controller 32, which receives the lookup table from NARX-NN 34, and for the measured position and speed of first mass 12, the ideal position and speed of the second mass 14, which would produce the maximum power output, is determined.

With the ideal position and speed of second mass 14 determined from the lookup table, the controller 32 sends a driving signal to the linear actuator 26 to either augment or dampen the motion of the second mass 14 (i.e., to either add or subtract from the present position and speed of the second mass 14) to match the ideal position and speed of the second mass 14 from the lookup table. This process is continuous, continuously measuring the position and speed of the first and second masses 12, 14 to provide continuous optimizing augmentation or dampening of the second mass 14 to maximize the power output of the linear generator 24. It should be understood that the linear actuator 26 may be any suitable type of linear actuator capable of instantaneously controlling the position and speed (or, equivalently, the amplitude and frequency) of the second mass 14.

Figure 3:
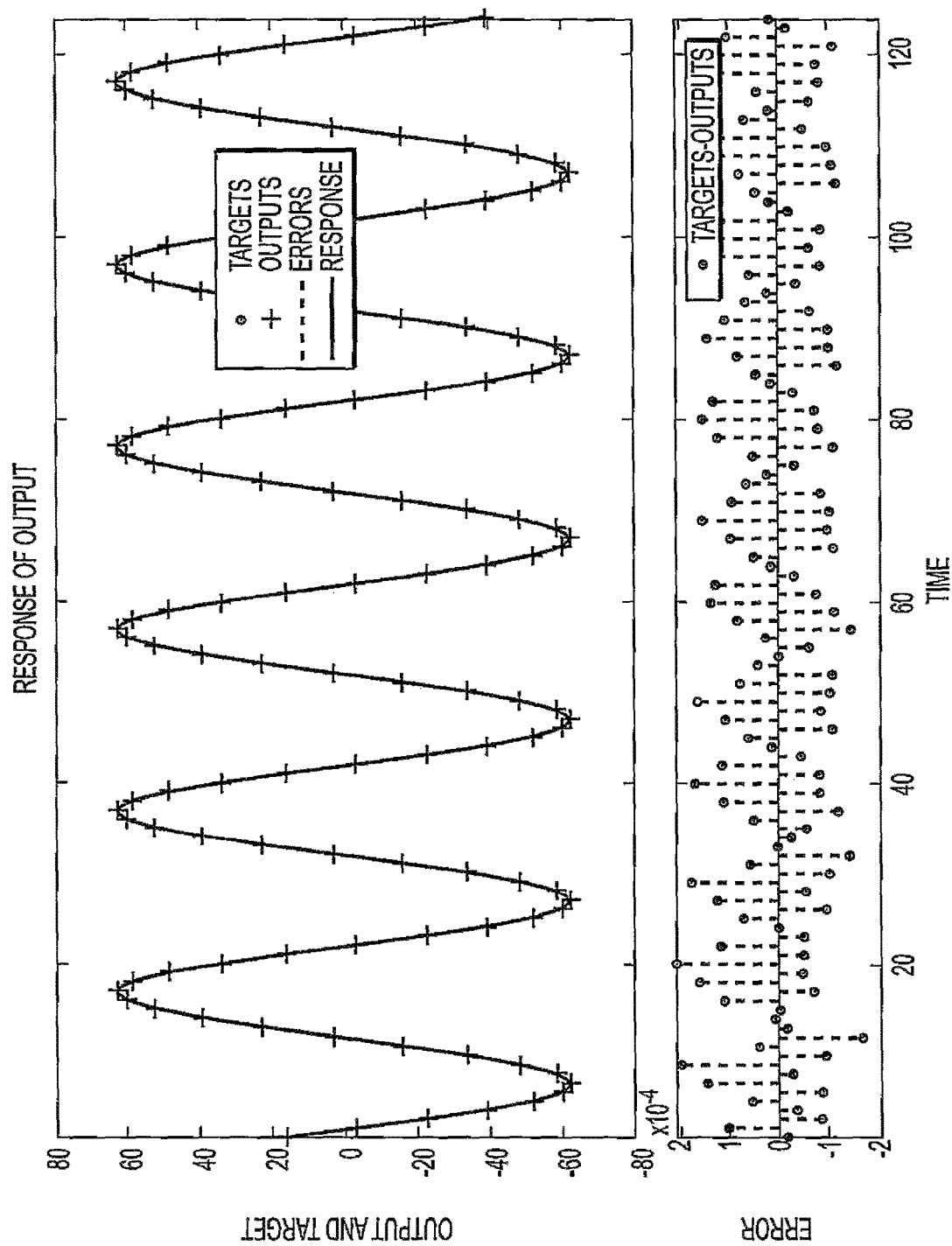
FIG. 3 is a waveform diagram showing the training results of a nonlinear autoregressive exogenous neural network (NARX-NN) of the ocean wave power generator with an artificially intelligent controller, particularly showing an output voltage response (top) and mean square error (MSE) performance (bottom).

In order to validate the effectiveness of the NARX-NN in modeling and controlling the ocean wave power generator 10, two layers were used to fit the dynamical input-output relationship system, using one single hidden layer that contained ten neurons. Two tap delays were used, one for motion input and one for voltage output, using two time-steps. The training results of the NARX-NN, shown in FIG. 3, show a highly accurate matching response of the ocean wave power generator 10 compared to the actual voltage output. This shows that the MARX-NN is trained efficiently in terms of matching the generator output response, as well as mean-square-error and correlation error. Further, the trained NN of the mean squared error shows a very high error performance of $9.09 \times 10^{-9}$.

Figure 4:
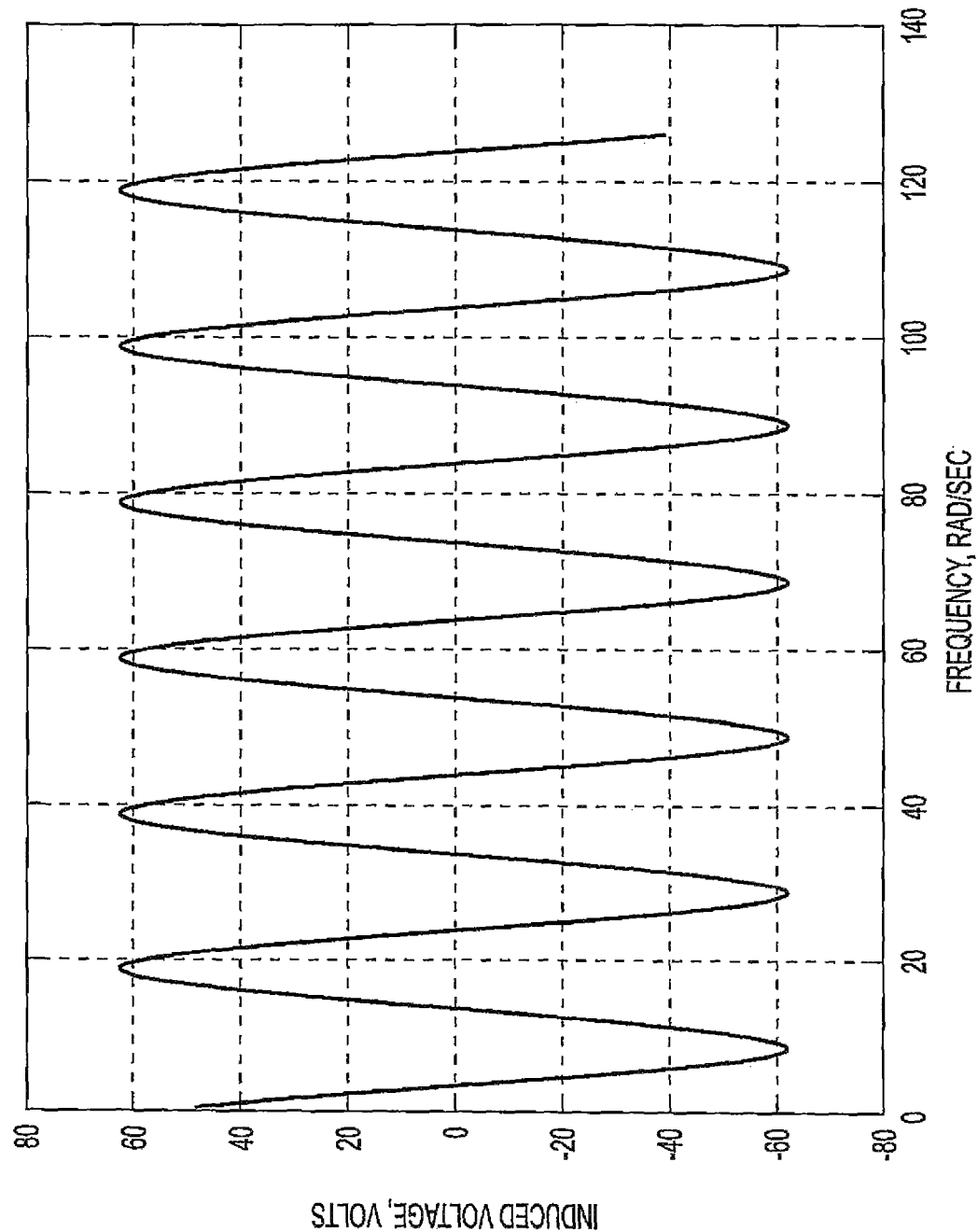
FIG. 4 is a plot of voltage vs. frequency showing electromotive voltage results produced by a linear generator similar to that used in the ocean wave power generator with an artificially intelligent controller.
Figure 5A:
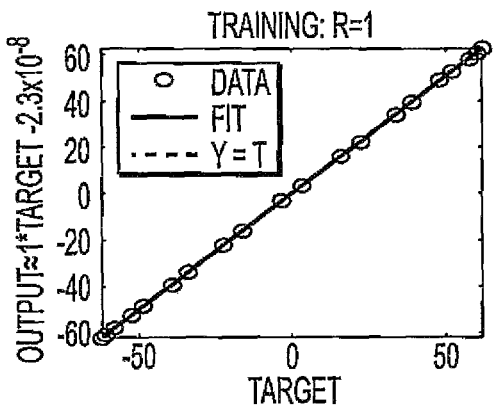
FIGS. 5A, 5B, 5C, and 5D show the NARX-NN regression maximum using a log scale.
Figure 5B:
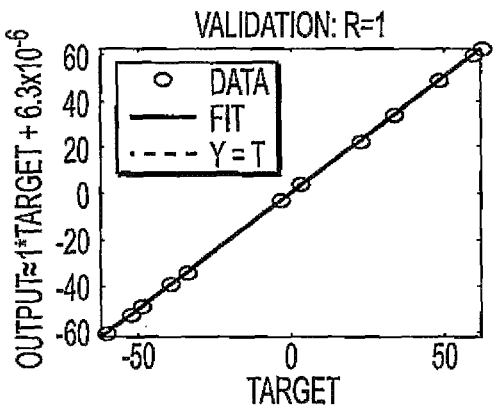
Figure 5C:
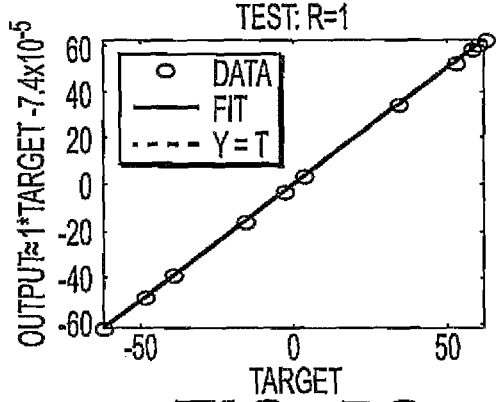
Figure 5D:
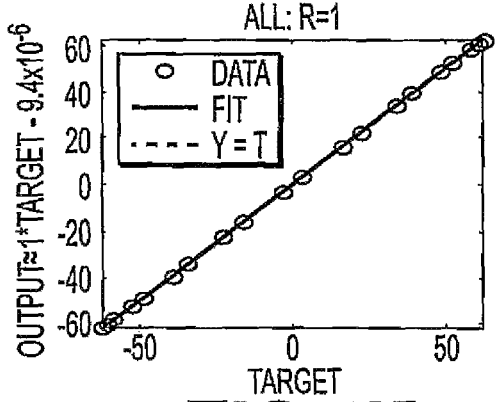

FIG. 4 shows the actual electromotive voltage produced by a linear generator for N=1000, B=1 Tesla, a nominal speed of 0.0625 m/sec, and a magnetic rod displacement of $\Delta L=0.0625 \sin(\omega t)$. Comparing the results of FIGS. 3 and 4, it is found that, the trained MARX-NN perfectly matches the modelled results against the actual measured results. Furthermore, a rapid drop in mean squared error performance of the trained NN is measured in a log scale, as displayed in FIGS. 5A-5D.

Figure 6:
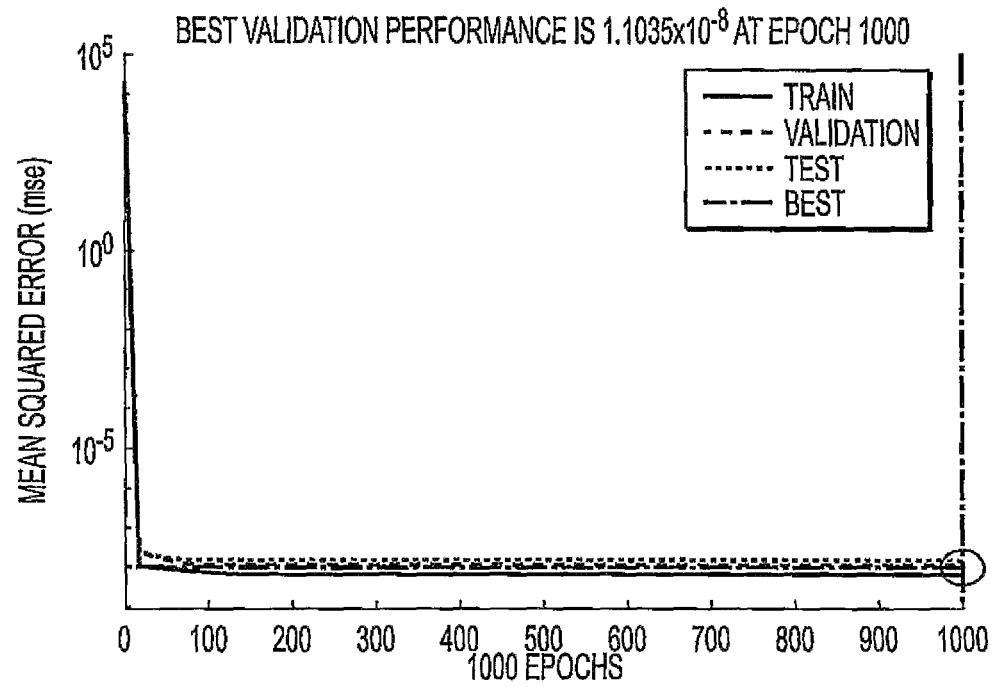
FIG. 6 is a graph comparing the MSE of training, validation and testing data sets of the NARX-NN.
Figure 7:
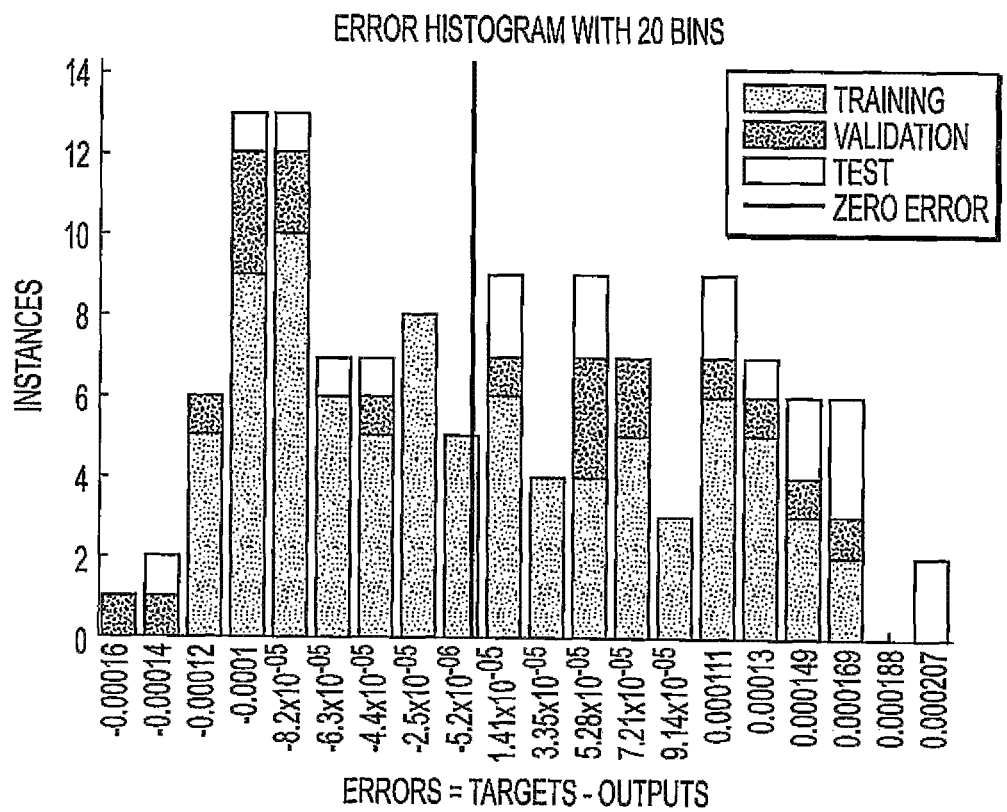
FIG. 7 is an error histogram of the training, validation and testing data sets at maximum epoch 1000.
Figure 8:
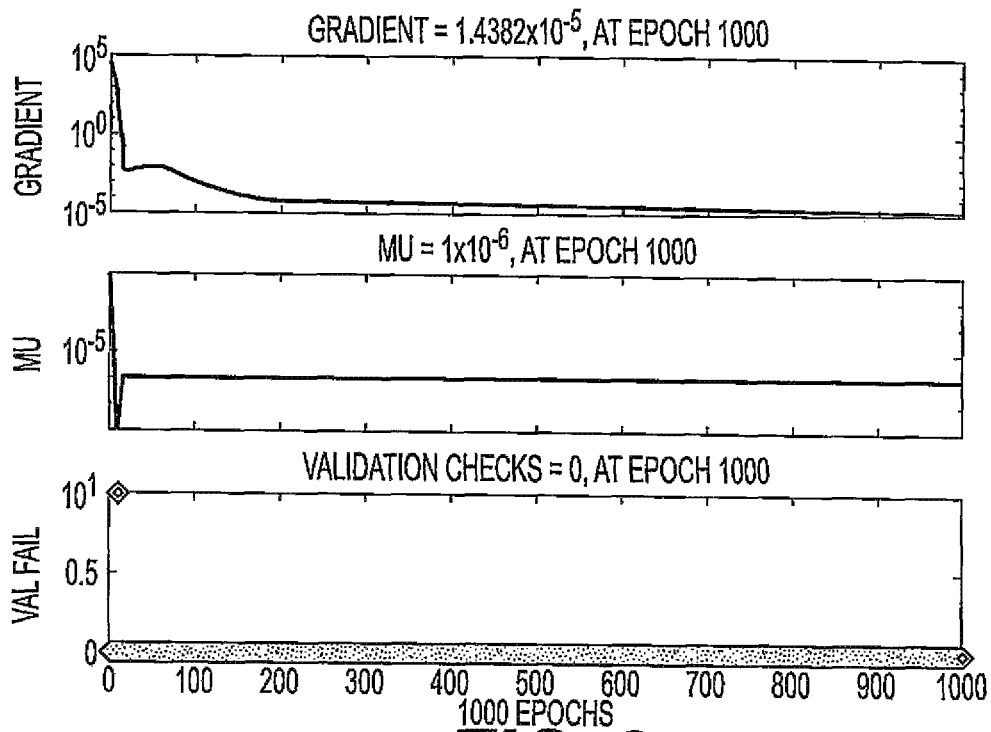
FIG. 8 is waveform diagrams showing the NARX-NN training state reaching maximum epoch 1000.
Figure 9:
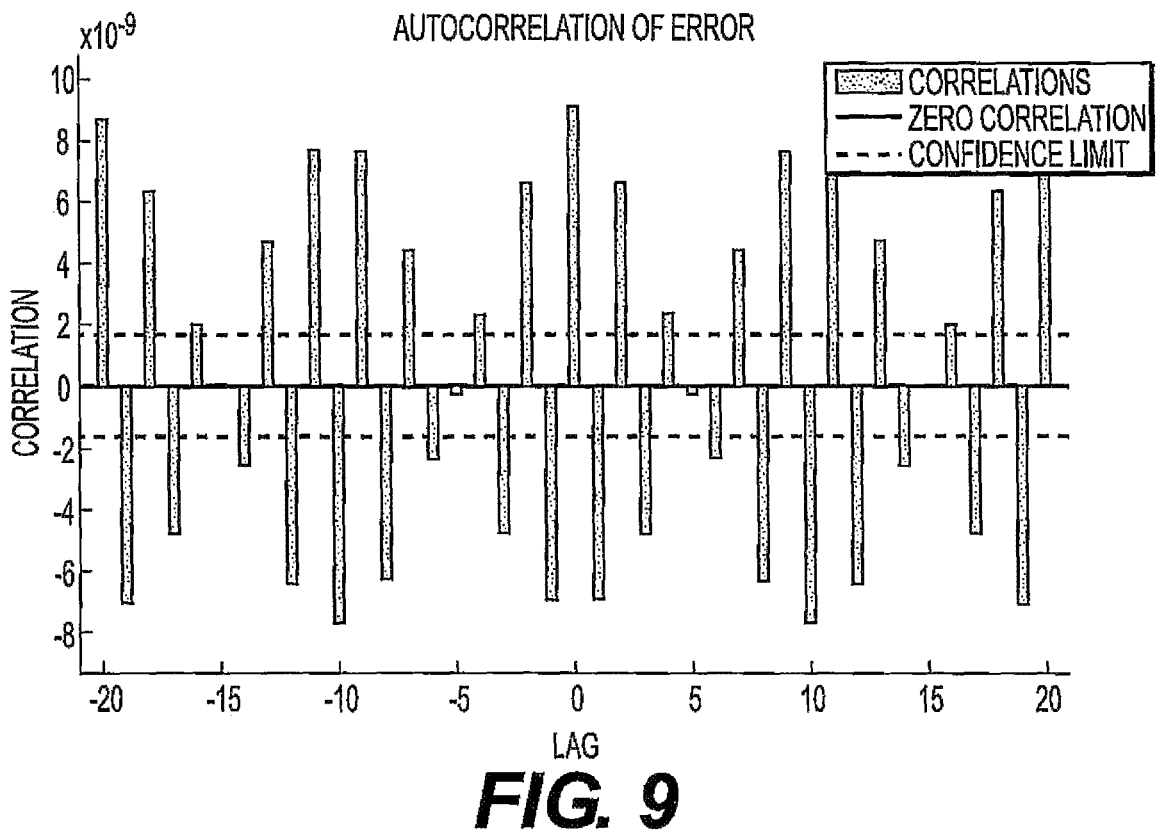
FIG. 9 is a chart showing training auto-correlation with a time varying lag at maximum epoch 1000 for the NARX-NN.
Figure 10:
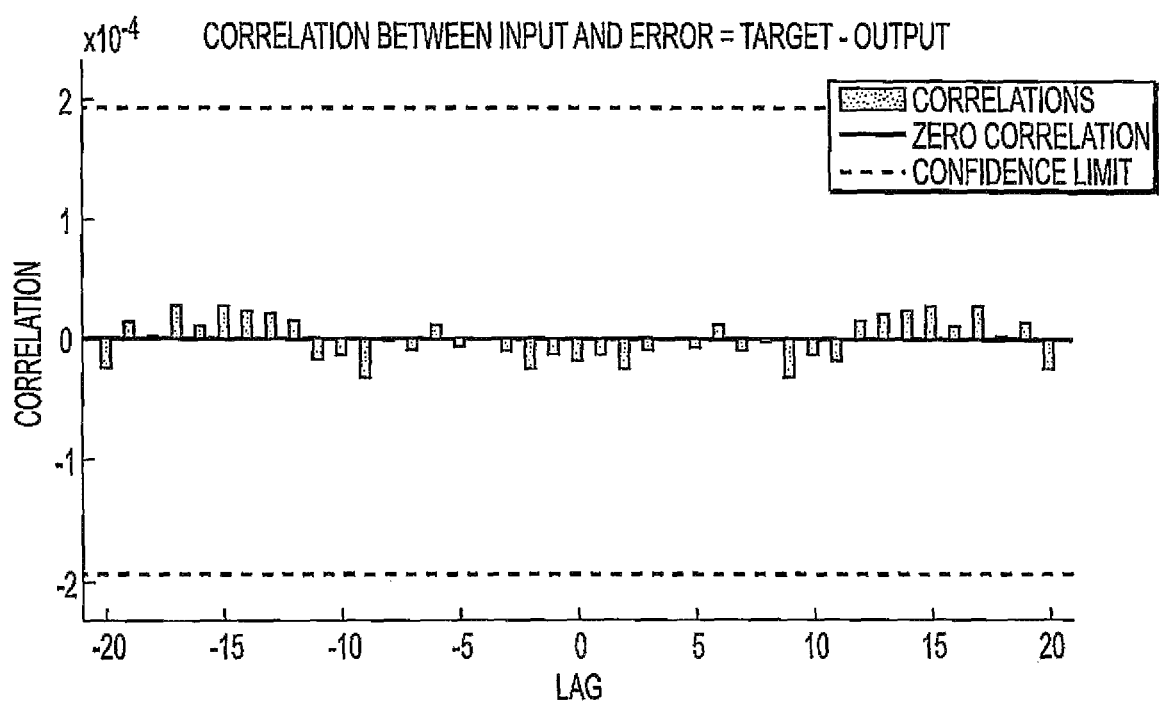
FIG. 10 is a diagram showing training input-error cross-correlation with a time varying lag at maximum epoch 1000 for the NARX-NN.

The neural network's performance for three sets of data (training, validation and testing) is shown in FIG. 6. The results show high accuracy training, with the best validation performance of $1.1 \times 10^{-8}$ at epoch 1000. Similarly, the NN training state and error histogram are shown reaching the maximum epoch at 1000 in FIGS. 7 and 8. Moreover, the correlation of error of the trained NN of the ocean wave power generator 10 as a function of time, with errors over varying lags, are displayed in FIG. 9. The error correlation results with respect to the NN inputs and varying lag fall within the confidence limits, as illustrated in FIG. 10.

Figure 11:
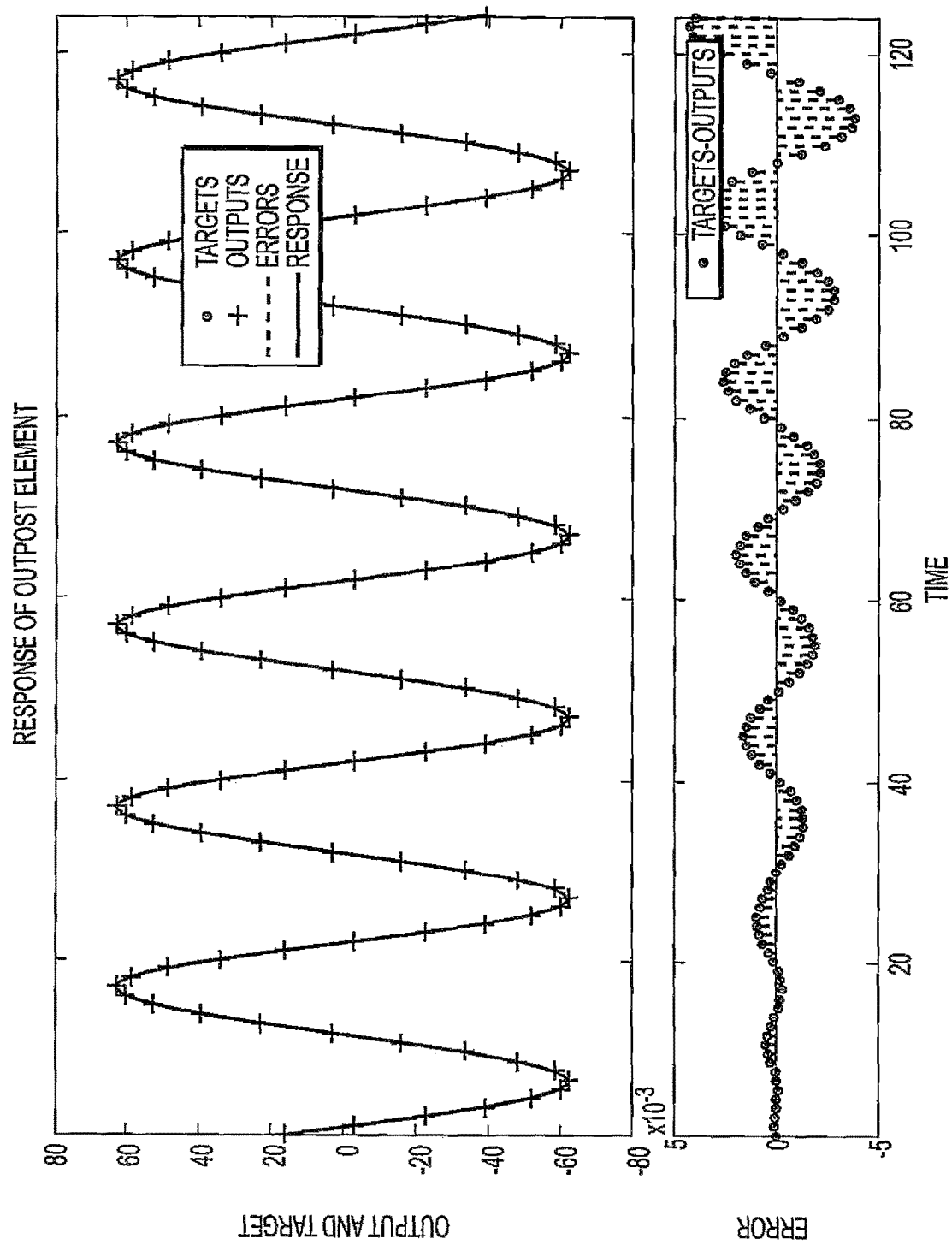
FIG. 11 is a plot showing the training results of a closed-loop NARX-NN model of the ocean wave power generator with an artificially intelligent controller, including the output voltage response (top) and the MSE performance (bottom).

Training of the NA-NN in closed loop form may be performed given initial voltage outputs, so that the NN uses its own predicted voltages recursively to predict new values. The results shows a good fit between the predicted and actual responses, but with non-perfect errors, as shown in FIG. 11. As shown, it took the system more than 120 seconds before the good match starts to separate.

It is to be understood that the ocean wave power generator with an artificially intelligent controller and a method of operating the same is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. An ocean wave power generator with an artificially intelligent controller, comprising:
   a first mass;
   a second mass;
   a first spring resiliently coupling the first mass and the second mass;
   a first damper joining the first mass and the second mass for damping relative oscillation between the first mass and the second mass;
   a second spring resiliently coupling the second mass and a support surface;
   a second damper joining the second mass and the support surface for damping relative oscillation between the second mass and the support surface;
   a linear generator mounted on the support surface, the linear generator being coupled to the second mass, relative oscillation between the second mass and the support surface driving the linear generator to generate power;
   a linear actuator coupled to the second mass;
   a first motion sensor positioned for detecting position and speed of the first mass;
   a second motion sensor positioned for detecting position and speed of the second mass; and
   a controller connected to the first and second motion sensors for receiving the position and the speed of the first mass from the first motion sensor and the position and the speed of the second mass from the second motion sensor, the controller being configured to output a driving signal to the linear actuator to drive oscillatory motion of the second mass to continuously optimize power output of the linear generator based on the position and, the speed of the first mass and the position and the speed of the second mass.

2. A method of controlling an ocean wave power generator, comprising the steps of:
   providing an ocean wave power generator having a first mass, a second mass, a first spring resiliently coupling the first mass and the second mass, a first damper joining the first mass and the second mass for damping relative oscillation between the first mass and the second mass, a second spring resiliently coupling the second mass and a support surface, a second damper joining the second mass and the support surface for damping relative oscillation between the second mass and the support surface, a linear generator mounted on the support surface, the linear generator being coupled to the second mass, and a linear actuator coupled to the second mass;
   detecting position and speed of the first mass;
   detecting position and speed of the second mass;
   determining maximum power output of the linear generator based on the position and the speed of the first mass;
   determining an ideal position and an ideal speed of the second mass corresponding to the maximum power output of the linear generator and the position and the speed of the first mass; and
   continuously adjusting the position and the speed of the second mass to obtain the determined ideal position and ideal speed of the second mass.

3. The method of controlling an ocean wave power generator as recited in claim 2, wherein the step of determining, the maximum power output of the linear generator and the ideal position and the ideal speed of the second mass comprises determining the maximum power output; and the ideal position and the ideal speed from a lookup table.

4. The method of controlling an ocean wave power generator as recited in claim 3, further comprising the step of producing the lookup table using a nonlinear autoregressive exogenous neural network, modeling the ocean wave power generator.

* * * * *